United States Patent
Lawrence

(10) Patent No.: US 9,848,594 B1
(45) Date of Patent: Dec. 26, 2017

(54) ANIMAL TRAP STABILIZER

(71) Applicant: Randall Lawrence, Bowling Green, MO (US)

(72) Inventor: Randall Lawrence, Bowling Green, MO (US)

( * ) Notice: Subject to any disclaimer, the term of this patent is extended or adjusted under 35 U.S.C. 154(b) by 0 days.

(21) Appl. No.: 15/201,797

(22) Filed: Jul. 5, 2016

(51) Int. Cl.
*A01M 23/24* (2006.01)

(52) U.S. Cl.
CPC .................. *A01M 23/245* (2013.01)

(58) Field of Classification Search
CPC .... A01M 31/002; A01M 23/18; A01M 23/30;
A01M 25/004; A01M 23/20; A01M
23/08; A01M 2200/011; A01M 23/005;
A01M 1/14; A01M 23/24; A01M 23/16;
A01M 1/026; A01M 23/02; A01M 23/00;
A01M 23/26
USPC ................ 248/346.01, 346.02; 43/58, 92, 96
See application file for complete search history.

(56) References Cited

U.S. PATENT DOCUMENTS

| 2,836,006 | A | 5/1958 | Beck |
| 4,267,660 | A | 5/1981 | Kielhorn |
| 4,272,907 | A | 6/1981 | Skapura |
| 4,505,064 | A | 3/1985 | Smagner |
| 4,660,319 | A | 4/1987 | Ellwood |
| 6,082,042 | A * | 7/2000 | Issitt ................... A01M 25/004 229/116 |
| 7,421,822 | B1 | 9/2008 | Ley |
| 7,513,479 | B2 * | 4/2009 | Li ....................... E04H 12/2238 135/16 |
| 7,642,472 | B2 * | 1/2010 | Hasenour ............. H02B 1/0565 174/520 |
| 2008/0072475 | A1 * | 3/2008 | Nelson ................ A01M 25/004 43/131 |
| 2011/0072709 | A1 * | 3/2011 | Patterson .............. A01M 23/30 43/81 |

* cited by examiner

*Primary Examiner* — Steven Marsh

(57) ABSTRACT

The animal trap stabilizer is adapted for use in bedding coil spring or long spring traps. The animal trap stabilizer is a structure formed in the shape of a rectangular shell that provides a non-compressible surface upon which the coil spring or long spring trap can be set. The animal trap stabilizer has formed in the surface a recessed structure that is shaped to allow the coil spring or long spring trap to be placed within the animal trap stabilizer such that the coil spring or long spring trap will be flush to the surface of the animal trap stabilizers. The animal trap stabilizer further comprises a mounting platform and a recessed structure.

15 Claims, 3 Drawing Sheets

US 9,848,594 B1

ANIMAL TRAP STABILIZER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hunting, trapping, and catching animals, more specifically, an auxiliary device adapted for use with a long or coil spring trap.

SUMMARY OF INVENTION

The animal trap stabilizer is adapted for use in bedding coil and long spring traps. The animal trap stabilizer is a structure formed in the shape of a rectangular shell that provides a non-compressible surface upon which the coil spring or long spring trap can be set. The animal trap stabilizer has formed in the surface a recessed structure that is shaped to allow the coil spring or long spring trap to be placed within the animal trap stabilizer such that the coil spring or long spring trap will be flush to the surface of the animal trap stabilizers.

These together with additional objects, features and advantages of the animal trap stabilizer will be readily apparent to those of ordinary skill in the art upon reading the following detailed description of the presently preferred, but nonetheless illustrative, embodiments when taken in conjunction with the accompanying drawings.

In this respect, before explaining the current embodiments of the animal trap stabilizer in detail, it is to be understood that the animal trap stabilizer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the animal trap stabilizer.

It is therefore important that the claims be regarded as including such equivalent construction insofar as they do not depart from the spirit and scope of the animal trap stabilizer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
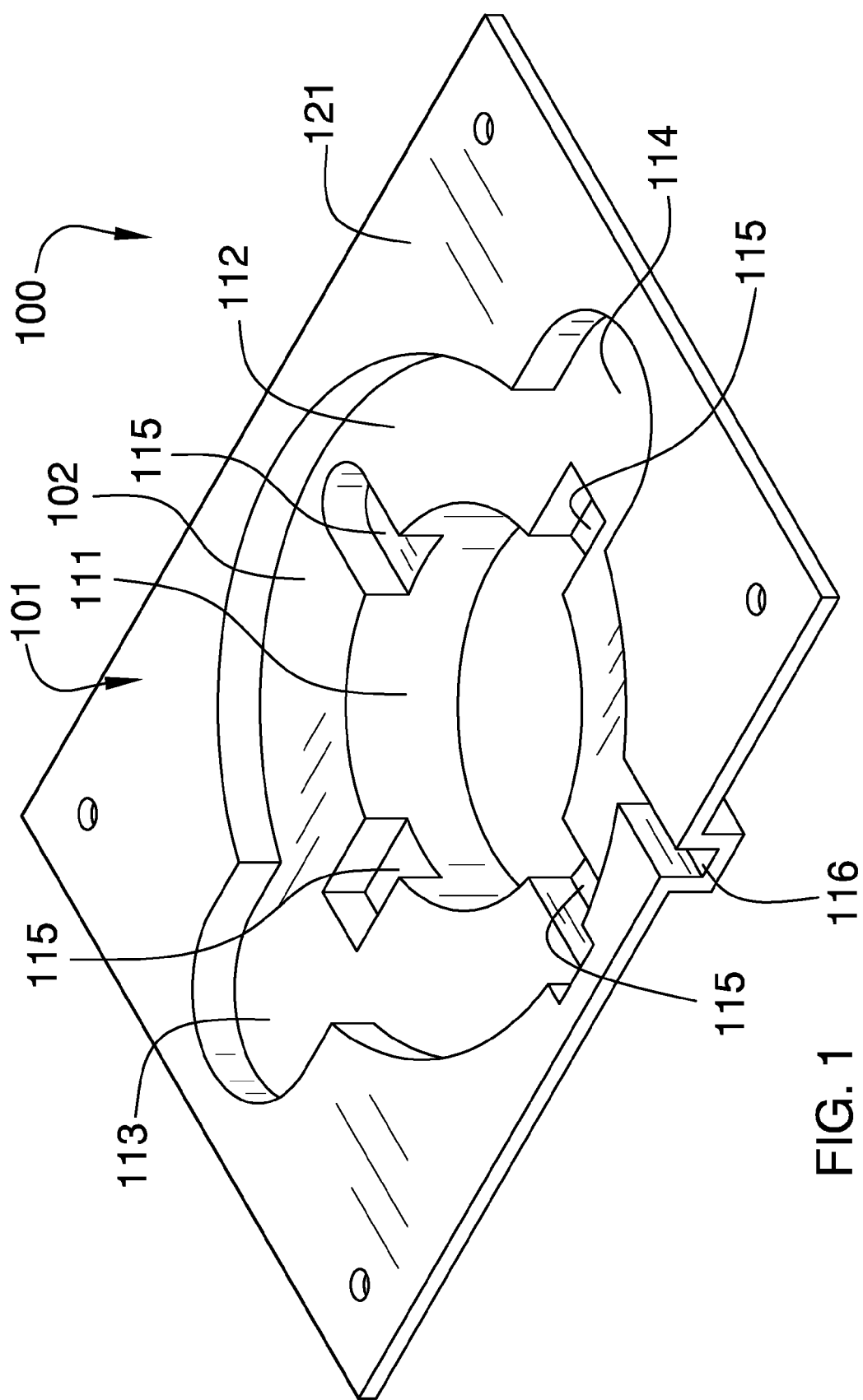
FIG. 1 is a perspective view of an embodiment of the disclosure.
Figure 2:
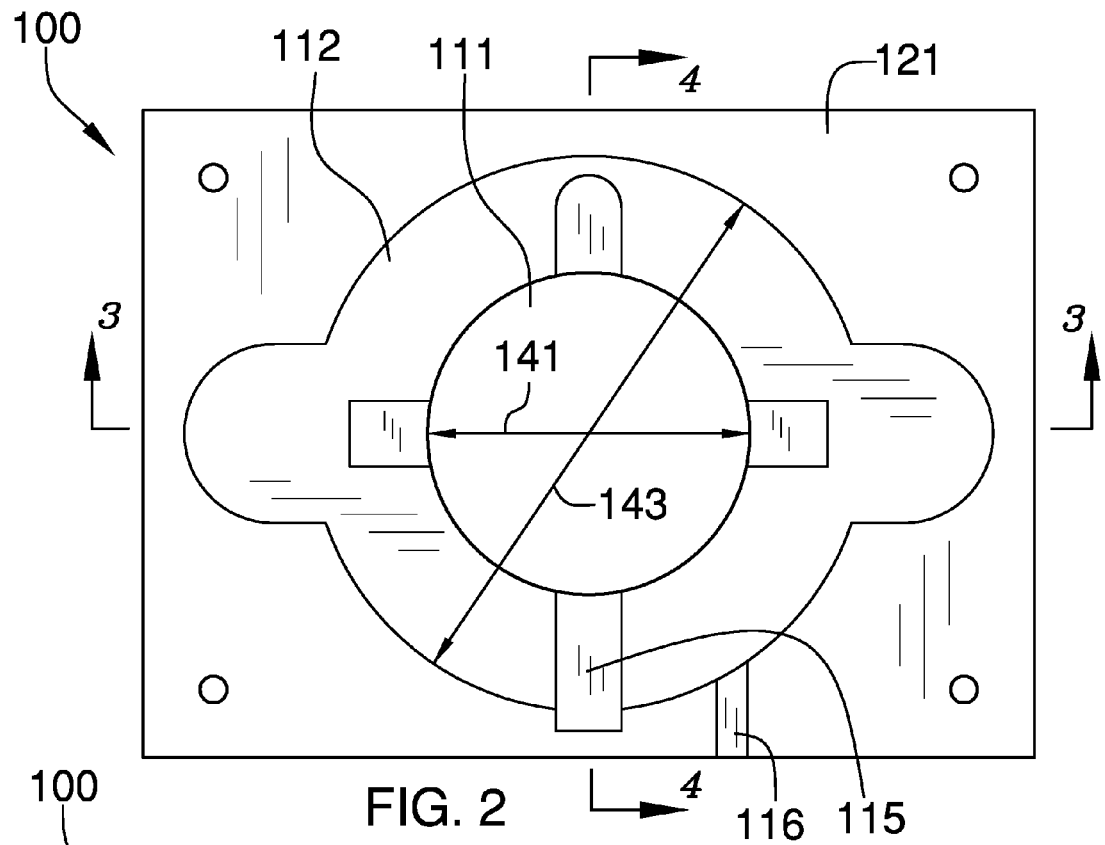
FIG. 2 is a top view of an embodiment of the disclosure.
Figure 3:
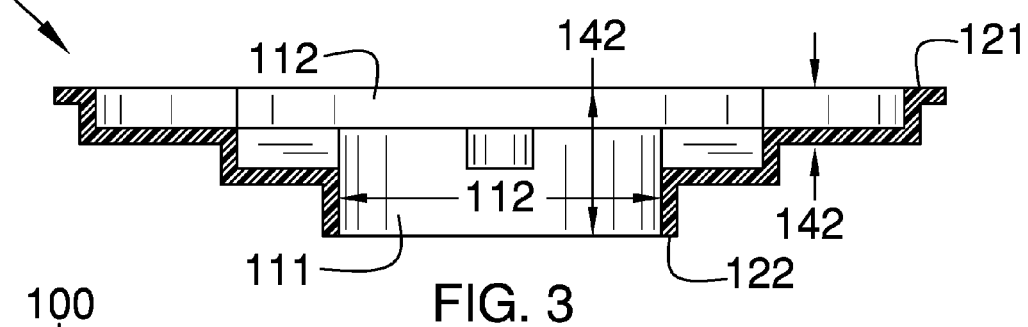
FIG. 3 is a cross-sectional view of an embodiment of the disclosure across 3-3 in FIG. 2.
Figure 4:
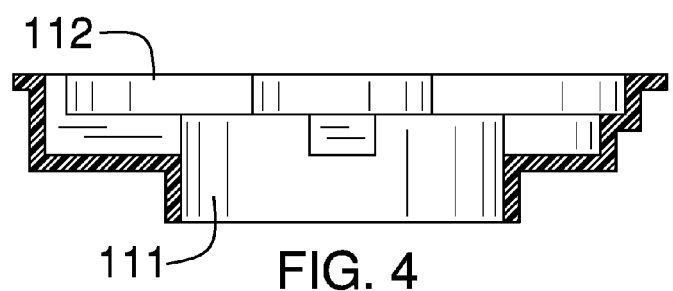
FIG. 4 is a cross-sectional view of an embodiment of the disclosure across 4-4 in FIG. 2.
Figure 5:
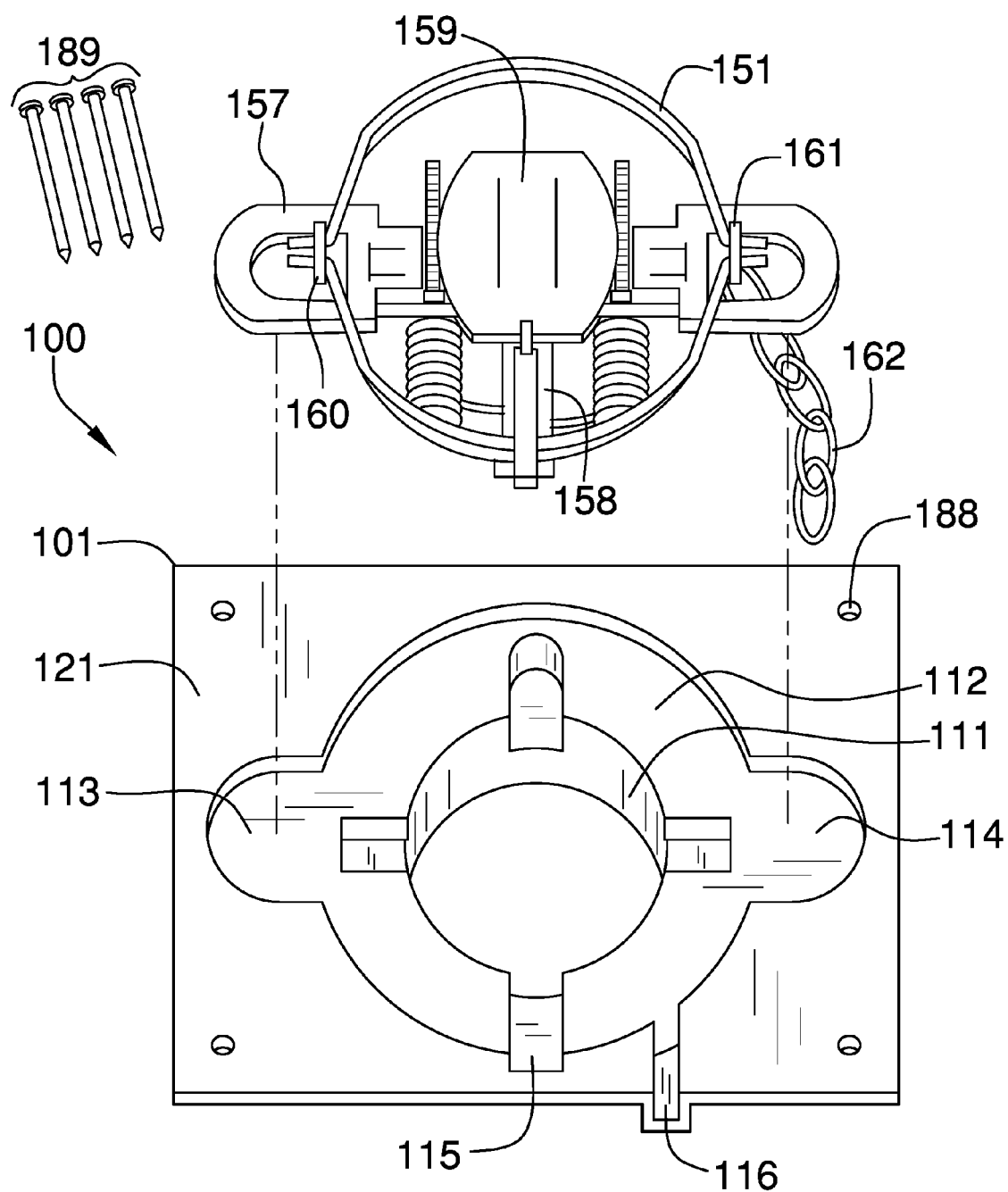
FIG. 5 is an in use view of an embodiment of the disclosure.

Detailed reference will now be made to a first potential embodiment of the disclosure, which is illustrated in FIGS. 1 through 5.

The animal trap stabilizer 100 (hereinafter invention) further comprises a mounting platform 101 and a recessed structure 102. The invention 100 is adapted for use in bedding a coil spring or long spring trap 151. The invention 100 is a structure formed in the shape of a rectangular shell that provides a non-compressible surface upon which the coil spring or long spring trap 151 can be set. The invention 100 has formed in the surface of the mounting platform 101 a recessed structure 102 that is shaped to allow the coil spring or long spring trap 151 to be placed within the mounting platform 101 such that the coil spring or long spring trap 151 is flush to the surface of the mounting platform 101 when the spring coil trap 151 is in the set position.

The mounting platform 101 is a rectangular shell structure that is further defined with a first surface 121 and a second surface 122. The second surface 122 of the mounting platform 101 is proximal to the ground when the invention 100 is used normally.

The recessed structure 102 is a cavity that is formed in the first surface 121 of the mounting platform 101. The recessed structure 102 is designed to receive and act as the bed for the setting of the coil spring or long spring trap 151. As shown in FIGS. 1 through 5, the recessed structure 102 further comprises an inner cylinder 111, an outer cylinder 112, a first lever lobe 113, a second lever lobe 114, a slot 115, and chain channel 116. The inner cylinder 111 is a cylindrically shaped hole that is formed in the first surface 121. The inner cylinder 111 is sized to receive a frame 157, a base plate 158, and a pad 159 of the coil spring or long spring trap 151. The inner cylinder 111 is further defined with an inner cylinder diameter 141 and an inner cylinder depth 142. The outer cylinder 112 is a cylindrically shaped hole that is aligned with the inner cylinder 111. The outer cylinder 112 is further defined with an outer cylinder diameter 143 and an outer cylinder depth 144.

The span of the outer cylinder diameter 143 is greater than the span of the inner cylinder diameter 141. The span of the outer cylinder depth 144 is lesser than the span of the inner cylinder depth 142. The outer cylinder diameter 143 is sized to receive the jaws of the coil spring or long spring trap 151 when the jaws are set position and engaged for trapping. The first lever lobe 113 is a cylindrically shaped cavity that connects to but projects away from the face of the outer cylinder 112. The first lever lobe 113 is sized to receive a first spring lever 160 of the coil spring or long spring trap 151. The second lever lobe 114 is identical to the first lever lobe 113 and is positioned diametrically opposite the position of the first lever lobe 113 along the outer cylinder 112. The second lever lobe 114 is sized to receive a second spring lever 161 of the coil spring or long spring trap 151.

The chain channel 116 is a channel that is formed from the face of the outer cylinder 112 to the edge of the mounting platform 101. The purpose of the chain channel 116 is to provide a channel within which to place a chain 162 that is used to secure the coil spring or long spring trap 151.

To use the invention 100, a hole is dug in the ground such that: 1) a recessed portion of the invention 100 fits in the hole, and 2) the depth of the hole is such that the coil spring or long spring trap 151 will be at or below ground level when the coil spring or long spring trap 151 is set. The invention 100 is the pressed into the hole to insure that the invention 100 is solidly set into the hole. The coil spring or long spring trap 151 is then set in the invention 100, and a pan cover and other natural cover are placed over the coil spring or long spring trap 151 and the invention 100.

The first surface 121 of the mounting platform 101 may include securing holes 188. The securing holes 188 are provided adjacent to corners of the first surface 121. Moreover, the securing holes 188 are optionally used to secure the invention 100 to a ground surface via stakes 189 as needed.

The intersection of the outer cylinder 112 with the inner cylinder 111 includes the slot 115. Moreover, the slot 115 may be a plurality of slots 115 that are equally spaced around the inner cylinder 111. The plurality of slots 115 is included where the coil spring or long spring trap 151 has additional components that necessitate the plurality of slots 115. In other words, different traps have different parts, which may require the plurality of slots 115.

The invention 100 is molded as a single unit from plastic. Alternately, the invention 100 can be machined into a rectangular shell of plastic. Suitable plastics include, but are not limited to, poly (methyl methacrylic), high density polyethylene, or polyoxymethylene. Polyoxymethylene is preferred.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Center Axis: As used in this disclosure, the center axis is the axis of a cylinder like structure. When the center axes of two cylinder like structures share the same line they are said to be aligned. When the center axes of two cylinder like structures do not share the same line they are said to be offset.

Cylinder: As used in this disclosure, a cylinder is a geometric solid defined by two identical flat and parallel ends that are circular in shape and connected with a single curved surface wherein when the cross section of the cylinder remains the same from one end to another. The axis of the cylinder is formed by the straight line that connects the center of each of the two identical flat and parallel ends of the cylinder. In this disclosure, the term cylinder specifically means a right cylinder, which is defined as a cylinder wherein the curved surface perpendicularly intersects with the two identical flat and parallel ends.

Exterior Screw Thread: An exterior screw thread is a ridge wrapped around the outer surface of a tube in the form of a helical structure that is used to convert rotational movement into linear movement.

Interior Screw Thread: An interior screw thread is a ridge wrapped around the inner surface of a tube in the form of a helical structure that is used to convert rotational movement into linear movement.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A trap bed comprising:
a mounting platform and a recessed structure;
wherein the trap bed is adapted for use in bedding a coil spring or long spring trap;
wherein the trap bed is a structure that provides a non-compressible surface upon which the coil spring or long spring trap can be set;
wherein the trap bed has formed in the surface of the mounting platform a recessed structure that is shaped to receive the coil spring or long spring trap;
wherein the recessed structure is formed such that coil spring or long spring trap is flush to a surface of the mounting platform when the spring coil trap is in the set position;
wherein the mounting platform is a rectangular shell structure;
wherein the mounting platform is further defined with a first surface and a second surface;
wherein the recessed structure is a cavity that is formed in the first surface of the mounting platform;
wherein the recessed structure further comprises an inner cylinder, an outer cylinder, a first lever lobe, a second lever lobe, a chain channel.

2. The trap bed according to claim 1 wherein
the inner cylinder is a cylindrically shaped hole that is formed in the first surface;
wherein the inner cylinder is further defined with an inner cylinder diameter;
wherein the inner cylinder is further defined with an inner cylinder depth.

3. The trap bed according to claim 2 wherein the inner cylinder is adaptively sized to receive a frame, a base plate and a pad of the coil spring or long spring trap.

4. The trap bed according to claim 3 wherein
the outer cylinder is a cylindrically shaped hole that is aligned with the inner cylinder;
wherein the outer cylinder is further defined with an outer cylinder diameter and an outer cylinder depth.

5. The trap bed according to claim 4 wherein the span of the outer cylinder diameter is greater than the span of the inner cylinder diameter.

6. The trap bed according to claim 5 wherein the span of the outer cylinder depth is lesser than the span of the inner cylinder depth.

7. The trap bed according to claim 6 wherein the outer cylinder diameter is sized to receive the jaws of the coil spring or long spring trap.

8. The trap bed according to claim 7 wherein the first lever lobe is a cylindrically shaped cavity that connects to but projects away from the face of the outer cylinder.

9. The trap bed according to claim 8 wherein the first lever lobe is sized to receive a first spring lever of the coil spring or long spring trap.

10. The trap bed according to claim 9 wherein
the second lever lobe is identical to the first lever lobe;
wherein the second lever lobe is positioned diametrically opposite the position of the first lever lobe along the outer cylinder.

11. The trap bed according to claim 10 wherein the second lever lobe is sized to receive a second spring lever of the coil spring or long spring trap.

12. The trap bed according to claim 11 wherein the chain channel is a channel that is formed from the face of the outer cylinder to the edge of the mounting platform.

13. The trap bed according to claim 12 wherein the first surface of the mounting platform includes at least one securing hole; wherein the at least one securing hole is provided adjacent to corners of the first surface; wherein the at least one securing holes is secured to a ground surface via a stake.

14. The trap bed according to claim 13 wherein an intersection of the outer cylinder with the inner cylinder includes the slot.

15. The trap bed according to claim 14 wherein the slot is further defined as a plurality of slots that are equally spaced around the inner cylinder.

* * * * *